US010333851B2

(12) United States Patent
Li et al.

(10) Patent No.: US 10,333,851 B2
(45) Date of Patent: Jun. 25, 2019

(54) SYSTEMS AND METHODS FOR CUSTOMIZING LAYER-2 PROTOCOL

(71) Applicants: Xu Li, Nepean (CA); Ngoc Dung Dao, Ottawa (CA)

(72) Inventors: Xu Li, Nepean (CA); Ngoc Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 15/296,760

(22) Filed: Oct. 18, 2016

(65) Prior Publication Data

US 2018/0109459 A1    Apr. 19, 2018

(51) Int. Cl.
| | | |
|---|---|---|
| *H04B 7/26* | (2006.01) | |
| *H04L 12/813* | (2013.01) | |
| *H04L 12/26* | (2006.01) | |
| *H04L 12/801* | (2013.01) | |
| *H04L 12/805* | (2013.01) | |
| *H04L 29/08* | (2006.01) | |
| *H04L 12/24* | (2006.01) | |
| *H04L 25/02* | (2006.01) | |
| *H04W 40/34* | (2009.01) | |

(52) U.S. Cl.
CPC ............ *H04L 47/20* (2013.01); *H04B 7/264* (2013.01); *H04L 41/5009* (2013.01); *H04L 43/0876* (2013.01); *H04L 43/16* (2013.01); *H04L 47/11* (2013.01); *H04L 47/365* (2013.01); *H04L 69/324* (2013.01); *H04L 25/0262* (2013.01); *H04W 40/34* (2013.01)

(58) Field of Classification Search
CPC ... H04L 29/08; H04L 45/123; H04L 25/0262; H04W 80/02; H04W 40/34; H04B 7/264
See application file for complete search history.

(56) References Cited

U.S. PATENT DOCUMENTS 7,630,393 B1 * 12/2009 Valencia ................. H04L 47/10
370/352
2007/0008894 A1 * 1/2007 Lynch ..................... H04L 43/067
370/244

(Continued)

FOREIGN PATENT DOCUMENTS

| CN | 102395161 A | 3/2012 | |
|---|---|---|---|
| CN | 104158675 A | 11/2014 | |
| WO | WO-2014183574 A1 * | 11/2014 | ............ G06F 9/5072 |

OTHER PUBLICATIONS

English Translation for WO-2014183574-A1 (Year: 2014).*

(Continued)

*Primary Examiner* — Salvador E Rivas

(57) ABSTRACT

A method includes: receiving, by a controller of a layer-2 network abstraction comprising a plurality of nodes interconnected by links, information defining at least a performance of each link; identifying, by the controller, at least one underperforming link of the network based on the received information; and for each identified under-performing link of the network: computing, by the controller, at least one updated layer-2 protocol parameter for at least one traffic flow of the under-performing link based on the information; and sending, by the controller, the at least one updated layer-2 protocol parameter to at least one node of the under-performing link.

20 Claims, 3 Drawing Sheets

(56) References Cited

U.S. PATENT DOCUMENTS

| | | | |
|---|---|---|---|
| 2011/0305143 A1* | 12/2011 | Gray | ........................ H04L 45/02 |
| | | | 370/242 |
| 2014/0089473 A1 | 3/2014 | Nakano | |
| 2014/0181573 A1* | 6/2014 | Goss | ........................ G06F 13/40 |
| | | | 714/5.11 |
| 2016/0276830 A1 | 9/2016 | Nasirian et al. | |

OTHER PUBLICATIONS

Wang et al., "M/M/c Queue with Two Priority Classes," Operations Research, vol. 63, No. 3, pp. 733-749, May 2015.
"Configuring Link Fragmentation and Interleaving for Multilink PPP", Jan. 18, 2018 [http://www.cisco.com.c/en/us/td/docs/ios/12_2/qos/configuration/guide/fqos_c/qcflfi.pdf].
International Search Report dated Dec. 28, 2018 for corresponding International Application No. PCT/CN2017/106119 filed Oct. 13, 2017.

* cited by examiner

SYSTEMS AND METHODS FOR CUSTOMIZING LAYER-2 PROTOCOL

CROSS-REFERENCE TO RELATED APPLICATIONS

This is the first application filed in respect of the present invention.

TECHNICAL FIELD

The present disclosure relates to communications networks, and in particular to systems and methods for customizing Layer-2 Protocol.

BACKGROUND

The Open Systems Interconnection model (OSI model) is a conceptual model that characterizes and standardizes the communication functions of a telecommunication or computing system without regard to its underlying internal structure and technology. The OSI model partitions a communication system into abstraction layers. The original version of the model defined seven layers.

The OSI model is hierarchical, in that a layer serves the layer above it and is served by the layer below it. For example, a layer that provides error-free communications across a network provides the path needed by the layer(s) above it, and uses the next lower layer to send and receive packets that are transported through that path.

Layer-2 of the OSI model is also referred to as the Data Link Layer, and provides node-to-node data transfer. That is, a link between two directly connected nodes. Among other things, the Data Link Layer defines the protocol(s) to establish and terminate a connection between two physically connected devices, and for flow control between them. The Data Link Layer also detects and possibly corrects errors that may occur in the physical layer (layer 1 of the OSI model), for example by means of Forward Error Correction (FEC).

Other conceptual models for characterizing and standardizing the communication functions of a telecommunication or computing system are known. Some of these conceptual models utilize a layered hierarchy, while others do not. However, in all cases, the network model provides functionality corresponding to that of the OSI layer-2 data link layer. Accordingly, it will be appreciated that references in the present disclosure to the OSI layer-2, or layer-2 functions, are not strictly limited to the OSI model, but instead also apply to equivalent conceptual abstractions and functionality in other networking models.

It is common to define a Maximum Transmission Unit (MTU), which is the largest size of data packet (layer 3 or higher) that can be transmitted by a Layer-2 interface without fragmentation. The size of the MTU can be varied by a network administrator, and is typically different for different protocols. For example, for Ethernet, the MTU is typically defined as 1500 byes, whereas for SONET/SDH, the MTU is typically set as 4470 bytes. Both Ethernet and SONET/SDH are capable of handling larger packets, but this is accomplished by fragmenting the packets across multiple protocol data units (PDU) at the transmitting end of a link, and then reassembling the packet at the receiving end of the link.

At OSI layers 3 and above, it is known to dynamically define the size of the MTU, so that it can be adjusted to avoid fragmentation at layer-2, for example. However, within Layer-2, the MTU size is manually defined, and remains fixed during operation of the network.

As will be appreciated, a larger MTU in layer-2 is preferred for carrying large data packets, because the larger MTU implies less fragmentation, and therefore lower latency. However, it has been found that increasing the MTU size can have the effect of blocking small size short burst packets. This can be problematic in cases where the small packets are also time sensitive. On the other hand, reducing the size of the MTU can degrade network performance due to a large number of concatenated frames. Consequently, network administrators generally adopt a compromise MTU size, such as the 1500 byte Ethernet MTU and the 4470 byte SONET/SDH MTU described above.

To ensure the Quality of Service (QoS) of time-sensitive traffic, there are currently two approaches used, namely: Fragmentation and interleaving; and Frame Preemption.

Fragmentation and interleaving is typically applied on Layer-2 at the source end of a link. Examples of this technique include Multi-link Point-to-Point Protocol (PPP) and Flex Ethernet. Fragmentation and interleaving is also applied on Layer 3 at the source node of a path, and is similar to IP fragmentation. This approach is software based and applied to pre-defined types of traffic according to pre-configured policies. As such, this represents a static solution, which cannot adjust as traffic flows and network performance change over time.

Frame preemption is also known as Time-sensitive networking. In this method, the sending node pauses the transmission of non-time sensitive frames in order to transmit time-sensitive ones. This approach is typically implemented at the physical layer (OSI layer 1) using special equipment designed for the purpose.

Thus the static solution has a technical problem to be solved.

SUMMARY

The embodiment of the invention provides a method and a controller for customizing Layer-2 protocol to accomplish the optimization of link performance for different types of traffic flows.

Accordingly, an aspect of the present invention provides a method comprising: receiving, by a controller of a layer-2 network abstraction comprising a plurality of nodes interconnected by links, information defining at least a performance of each link; identifying, by the controller, at least one underperforming link of the network based on the received information; and for each identified under-performing link of the network: computing, by the controller, at least one updated layer-2 protocol parameter for at least one traffic flow of the under-performing link based on the information; and sending, by the controller, the at least one updated layer-2 protocol parameter to at least one node of the under-performing link.

A further aspect of the present invention provides a controller of a layer-2 abstraction of a network comprising a plurality of nodes interconnected by links. The controller comprises: a central processing unit; and a non-transitory storage medium storing software instructions configured to control the central processor unit to: receive information defining at least a performance of each link of the layer-2 abstraction; identify at least one under-performing link of the network based on the received information; and for each identified under-performing link: computing updated layer-2 protocol parameters for at least one traffic flow of the under-performing link; and sending the at least one updated layer-2 protocol parameter for at least one traffic flow of the under-performing link to at least one node of the under-performing link.

An advantage of the present invention is that the controller computes the updated layer-2 protocol parameter for the traffic flow of the under-performing link based on the evolving performance of the network, thus the controller can dynamically adjust the Layer-2 parameters in this manner to optimize link performance for different types of traffic flows at the Data Link Layer.

BRIEF DESCRIPTION OF THE DRAWINGS

Features and advantages of the present invention will become apparent from the following detailed description, taken in combination with the appended drawings, in which.

It will be noted that throughout the drawings, like elements are identified by like reference numerals.

DETAILED DESCRIPTION

The present disclosure provides systems and methods for customizing layer-2 protocol parameters.

Figure 1:
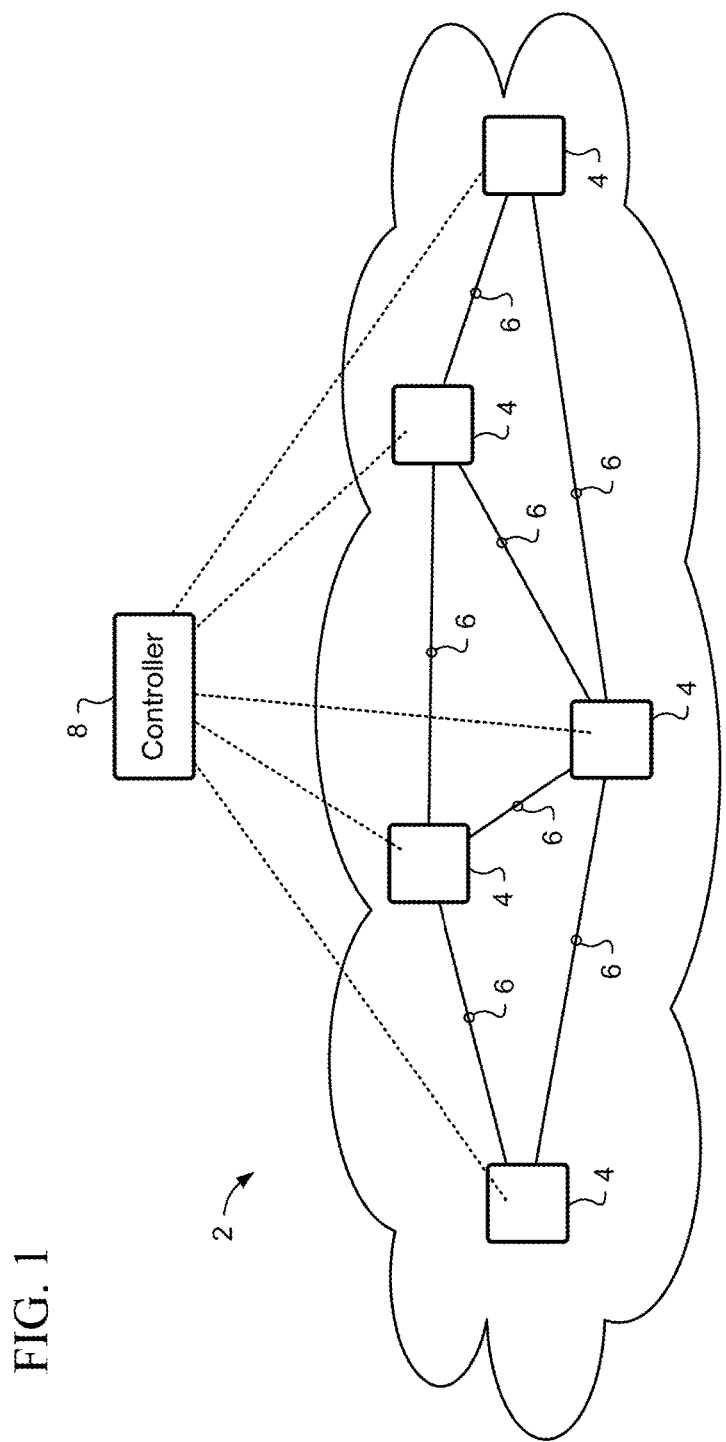
FIG. 1 is a block diagram schematically illustrating principal elements of a network in which techniques in accordance with the present disclosure may be implemented.

FIG. 1 is a block diagram illustrating principle elements of a network configured to implement methods in accordance with the present technique. As may be seen in FIG. 1, the layer-2 abstraction of a communication network 2 includes a plurality of nodes 4 interconnected by links 6. Each of the nodes 4 is also connected to a controller 8 configured to implement techniques in accordance with the present disclosure.

Each node 4 of the layer-2 abstraction 2 may comprise any suitable combination of hardware and software implementing one or more layer-2 protocols for transmitting and receiving frames through the links of the layer-2 abstraction. Each node 4 of the layer-2 abstraction 2 may correspond with a physical node of the network, but this is not essential.

Each link 6 of the layer-2 abstraction represents a data connection between adjacent nodes 4 of the network, In this respect, the term "adjacent" shall be understood to relate to the topology of the layer-2 abstraction 2 of the network, which may or may not correspond with the physical topology of the network. Thus, for example, each link 6 of the layer-2 abstraction 2 of the network may encompass one or more physical spans and physical nodes of the network. Similarly, the links 6 of the layer-2 abstraction 2 of the network may define a mesh-connected topology, while the physical topology of the network may be configured as one or more rings.

The controller 8 may comprise any suitable combination of hardware and software configured to implement management functions in respect of the nodes 4 and links 6. In some embodiments, the controller 8 may be co-located with one or more nodes of the network. In other embodiments, the controller 8 may be implemented by a central computer such as, for example, a management computer implementing Operations Administration and Management (OAM) of the network. In general terms, it is contemplated that the controller 8 will comprise at least one central processing unit (CPU) connected to a memory or other suitable non-transitory storage medium storing software instructions for controlling the CPU to execute the methods described in the present disclosure.

Figure 2:
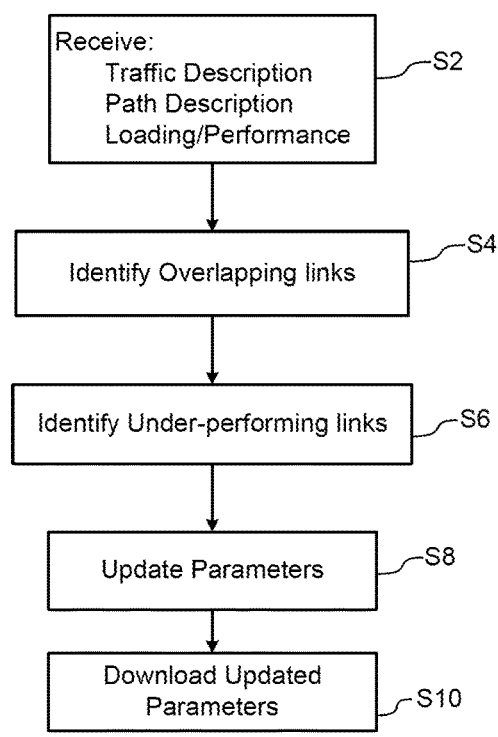
FIG. 2 is a flowchart showing principal steps in an example process for dynamically adjusting layer-2 protocol parameters in the Layer-2 network abstraction shown in FIG. 1.

FIG. 2 is a flowchart showing principal steps in an example process for dynamically adjusting at least one layer-2 protocol parameter in the Layer-2 network abstraction shown in FIG. 1.

In a first step (at S2), for each node 4 and link 6, the controller 8 receives as inputs any one or more of: traffic description information; path description information (e.g. route list composition, logical or physical); and performance data defining a performance of each link 6.

In general, the traffic description information defines characteristics of each traffic flow in each link 6 of the layer-2 network abstraction 2. The traffic description information may include flow characteristics such as bit rate, average packet size and packet arrival model, as well as QoS requirements such as delay and delay jitter for each traffic flow in each link 6. In addition, the traffic description information may include a delay budget for each service (or each customer), particularly for delay sensitive traffic flows for each traffic flow in each link 6. The traffic description information may be obtained from one or more customers, a network management system, or learned by the controller 8 through traffic statistics gathered by the nodes 4.

In general, the Path description information defines a topology of the layer-2 network abstraction 2, which may include information defining characteristics of each link 6 of the. In some embodiments, the Path description information may include a route list defining physical nodes traversed by a given link 6, as well as an indication of whether the link 6 is a physical or a logical link. The Path description information may be obtained from a Software Defined Topolocy (SDT) controller, a session manager, or a Traffic Engineering (TE) controller, any one or more of which are conventionally present in a modern communications network.

In general, the performance information describes a current performance of each link 6 of the layer-2 network abstraction 2. For example, the Performance information may include information defining congestion and/or transmission delay on each link 6 of the network. In some cases, performance information may be available to the controller 8 for each span of the physical network. The performance information can be obtained from the network management statistics normally generated as part of the Operations Administration and Management (OAM) of the network.

Next, the controller 8 identifies (at S4) 'overlapping' links among multiple sessions or services. In this respect, the term overlapping implies overlapping in the physical layer. For example, two or more links 6 in the layer-2 abstraction 2 of FIG. 1 may utilize the same physical layer link. As may be appreciated, the overlapping links can be identified from the Path description information associated with each link 6 in the layer-2 network abstraction 2. For example, consider an embodiment in which the Path description information associated with each link 6 comprises a respective route list defining physical nodes traversed by the link 6. Each physical link can be positively identified by two physical nodes that are adjacent to each other in the route list. Accordingly, comparison between the respective route lists of any two links 6 in the layer-2 network abstraction 2 can readily identify any physical layer links that are shared by the two links 6.

Next, the controller 8 may use the performance information to identify (at S6) those overlapping links that are suffering high congestion or have comparatively high delays due to loading, for example. These underperforming links may include low-speed links that are carrying small-size delay-sensitive traffic; or low-speed link segments (i.e. the physical layer links that are shared between two or more layer-2 links 6) that are carrying small-size delay-sensitive traffic. For the purposes of the present disclosure, references to "small-size" traffic or "small-size" packets shall be understood to refer to traffic flows composed of layer-3 (or higher) data packets that are smaller than the average packet size defined in the traffic description information.

For each of the identified underperforming links, the controller 8 may use the corresponding traffic description information to compute (at S8) updated Layer-2 protocol parameters. In some embodiments, the updated Layer-2 protocol parameters may include updated MTU parameters, such as the size of the MTU, for example. A representative process for computing updated MTU parameters is described below. If desired, the updated MTU parameters may be computed on any of a per session, per traffic class, per flow, per UE, per UE group, per service or any other suitable basis. For example, the MTU parameters for one traffic class may be changed, while being held constant for another traffic class.

In some embodiments, the updated Layer-2 protocol parameters computed by the controller 8 may also include updated parameters defining any one or more of a Layer-2 protocol configuration, Interleaving policy and QoS policy. The Layer-2 protocol configuration defines the Layer-2 protocol to be used (e.g. multi-type PPP, or Flex Ethernet). In the case of a logical link, a Layer-2 tunnel may be created dynamically while a Layer-3 tunnel is in operation. The interleaving policy defines how small-size packets are interleaved with packet fragments for transmission. The QoS policy defines how different traffic flows are prioritized and queued for transmission. Respective representative process for computing updated parameters of the Layer-2 protocol configuration, Interleaving policy and QoS policy are described below.

Once the controller 8 has defined the updated parameters for an underperforming link, the controller 8 sends (at S10) the updated parameters to at least the transmitting node of the underperforming link, so that the transmitting node can continue transmitting traffic using the new updated parameters. In some cases, for example where the updated parameters include parameters defining any one or more of a Layer-2 protocol configuration, Interleaving policy and QoS policy, the controller 8 may download the updated parameters to both of the nodes of the underperforming link. Upon receipt of updated parameters from the controller 8, each node may install the updated parameters using methods known in the art, so that traffic can be sent and received using the new updated parameters.

If desired, link concatenation can be applied to reduce overhead. That is, a sequence of links that apply the same Layer-3 protocol can be concatenated into a single Layer-2 link and new layer-2 protocol policy parameters computed and installed in the end-nodes of the concatenated Layer-2 link.

As may be appreciated, updated MTU parameters can be computed in various ways. For example, a link 6 may be represented as an M/M/c queue with different service rates for different classes of service. M/M/c queues are known in the art, and so will not be described in greater detail herein. Representing a link as an M/M/c queue, where "c" represents the number of physical layer paths implementing the link 6 of the layer-2 abstraction 2, enables known analytical techniques to be used to determine when the service rate of a given class of service should be increased or decreased. For example, J. Wang, O. Baron, and A. Scheller-Wolf, "M/M/c Queue with Two Priority Classes," Operations Research, vol. 63, no. 3, pp. 733-749, May 2015, presents analytical solutions for the case of an M/M/c queue with two classes of service, one of which preempts the other. The analytical solution of Wang et al may be directly applied to the case of a link 6 having traffic flows in two different classes of service (such as, for example, delay-sensitive and delay-non-sensitive) where one of the two classes of service (e.g. delay-sensitive) can preempt the other class of service (e.g. delay-non-sensitive).

Since the service rate (i.e. the line rate) of a link 6 is normally fixed by the physical layer, it is generally not possible to directly adjust the service rate in Layer-2 in the manner proposed by Wang et al. However, adjusting the MTU for one (or each) class of service has the equivalent effect. Thus the effective service rates for each class of service in a given link 6 can be adjusted by changing the MTUs of each class of service on that link 6.

If desired, the MTU size can be adjusted iteratively to optimize performance of a link 6 and or to accommodate changing traffic conditions. For example, in order to increase the service rate of delay non-sensitive traffic (and so reduce the effective service rate of delay sensitive traffic), in each iteration the MTU size for the delay non-sensitive traffic may be doubled and then the performance of each traffic class of service may be measured. If the performance of the delay sensitive traffic class has not degraded (or has degraded within a tolerable limit) then the MTU size for the delay non-sensitive traffic may be again doubled in the next iteration. This progressive doubling of the MTU size for the delay non-sensitive traffic can be repeated until the performance of the delay sensitive traffic class has degraded beyond the tolerable limit. The MTU size for the delay non-sensitive traffic can then be downsized in a binary search manner until the performance of the delay sensitive traffic class is acceptable and the improvement to the delay non-sensitive traffic becomes unchanged or less than a predetermined threshold.

As is known in the art, in a binary search, the parameter being adjusted (in this case the MTU size of the delay non-sensitive traffic) is changed upwards or downwards by a given step size, which is reduced by half at each iteration. For example, in a first iteration, the step size may be equal to half the original MTU size, and then in the second iteration the step size is reduced to a quarter of the original MTU size, and so on. This approach can be used to find an optimum MTU of the delay non-sensitive traffic, by reducing the MTU size of the delay non-sensitive traffic by a step size equal to half the value of the original MTU in the first iteration, and then measuring the performance of each traffic class of service. If the service rate of delay-sensitive traffic still needs to be increased, then in the second iteration the MTU of the delay non-sensitive traffic can be further reduced by a step size equal to a quarter of the value of the original MTU. This process may continue until an improvement in the performance of delay-sensitive traffic either remains unchanged between iterations, or is less than a predetermined threshold.

Conversely, in order to increase the service rate of delay-sensitive traffic (and so reduce the effective service rate of the delay non-sensitive traffic), a binary search can be performed to further downsize the MTU of the delay non-sensitive traffic. This approach can be used to find an MTU size of the delay non-sensitive traffic that optimizes the effective service rate of the delay-sensitive traffic, by reducing the MTU size of the delay non-sensitive traffic until an improvement in the performance of delay-sensitive traffic either remains unchanged between iterations, or is less than a predetermined threshold.

Parameters of the interleaving policy may be computed based on the delay budget of the small-size packets and the service rate on any given link 6. For example, according to Little's law, the average sojourn time of a small-size packet (i.e. the total time it spends traversing a given link) may be defined as:

$$T_s = \frac{1}{(\mu - \lambda)},$$

where: $\mu$ is the actual service rate of small-size packets (due to interleaving packet fragments); and $\lambda$ is the arrival rate of small-size packets at the transmitting node of the link, which can be measured by the transmitting node or estimated from link metrics.

The average sojourn time $T_s$ on the link should not be larger than the delay budget of small-size packets on that link. That is $D_B \geq T_S$. As is known in the art, the delay budget $D_B$ for each link is typically determined based on the type of traffic flow (for example, delay-sensitive vs. non delay sensitive) and so is known to the network management system.

The actual service rate $\mu$ of small-size packets (due to interleaving packet fragments) can be represented as:

$$\mu = \frac{1}{\left(\frac{x}{r} - \frac{1}{r'}\right)}$$

where r is the service rate of packet fragments transmitted through the link (in number of fragments per second); r' is the service rate of small-size packets transmitted through the link (in number of packets per second); and x is the number of packet fragments transmitted through the link between two small-size packets. The service rate r of packet fragments through the link and the service rate r' of small-size packets through the link are functions of the link performance, and can be measured by the nodes at either end of the link. The number x of packet fragments transmitted through the link between two small-size packets is the interleaving policy parameter that is to be determined.

Substituting the equation for into the equation for $T_s$ yields an inequality with a single variable x. Solving the inequality $D_B \geq T_s$ yields a range of values of x. The largest value in the range can be chosen as the selected parameter value for the interleaving policy.

As noted above, the QoS policy defines how different traffic flows are prioritized and queued for transmission. For example, in one QoS policy, small-size packets may be designated as preemptive. Such a policy maximizes the service rate of small-size packets, and removes the need for an interleaving policy. On the other hand, an alternative QoS policy may be to set up a first-in-first-out (FIFO) queue for small-size packets, and a second queue (which may or may not be a FIFO queue) for other packets. In this case, an interleaving policy may be determined as described above. Other QoS policies may also be defined, as desired.

As may be appreciated, a set of two or more different QoS policies may be defined and selected as needed to increase the effective service rate of a desired traffic flow. For example, if it is desired to increase the effective service rate of small size packets, the QoS policy designating small-size packets as pre-emptive may be selected. On the other hand, if it is desired to increase the effective service rate of larger packets, the QoS policy assigning the small-size packets and larger packets to respective queues may be selected, along with computing an appropriate parameter for the interleaving policy.

Figure 3:
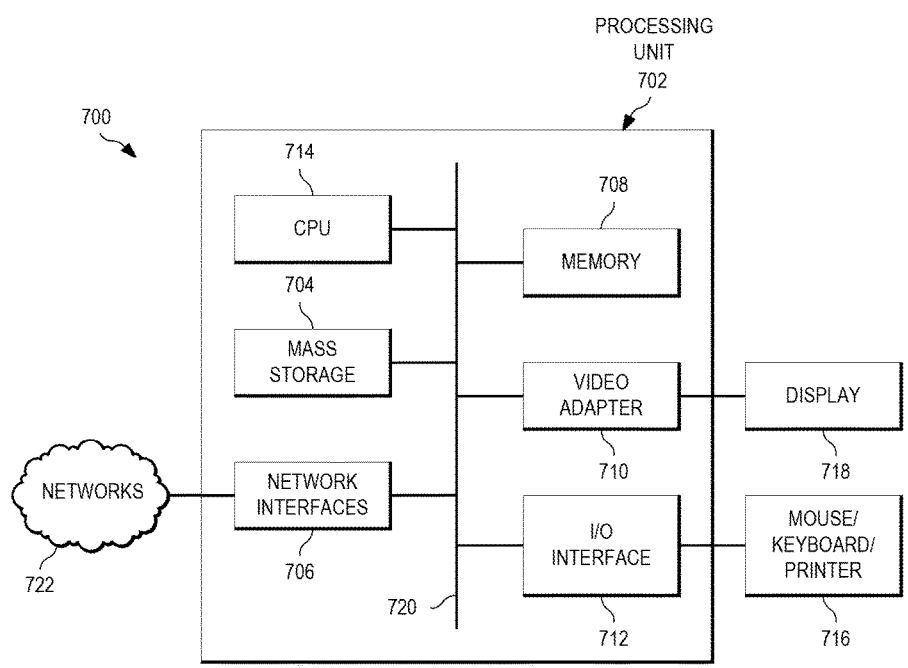
FIG. 3 is a block diagram schematically illustrating a system usable in the techniques in accordance with the present disclosure.

FIG. 3 is a block diagram of a computing system 700 that may be used for implementing the devices and methods disclosed herein, For example, the computing system can be any node 4, controller 8, or other entity shown in FIG. 1. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 700 includes a processing unit 702. The processing unit includes a central processing unit (CPU) 714, memory 708, and may further include a mass storage device 704, a video adapter 710, and an I/O interface 712 connected to a bus 720.

The bus 720 may be one or more of any type of several bus architectures including a memory bus or memory controller, a peripheral bus, or a video bus. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, or an optical disk drive.

The video adapter 710 and the I/O interface 712 provide interfaces to couple external input and output devices to the processing unit 702. As illustrated, examples of input and output devices include a display 718 coupled to the video adapter 710 and a mouse/keyboard/printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device.

The processing unit 702 also includes one or more network interfaces 706, which may comprise wired links, such as an Ethernet cable, and/or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a establishing unit/module for establishing a serving cluster, a instantiating unit/module, an establishing unit/module for establishing a session link, an maintaining unit/module, other performing unit/module for performing the step of the above step. The respective units/modules may be hardware, software, or a combination thereof. For instance, one or more of the units/modules may be an integrated circuit, such as field programmable gate arrays (FPGAs) or application-specific integrated circuits (ASICs).

The embodiments of the invention described above are intended to be representative only. The scope of the invention is therefore intended to be limited solely by the scope of the appended claims.

We claim:

1. A method for customizing Layer-2 protocol, comprising:
   receiving, by a controller of a layer-2 network abstraction comprising a plurality of nodes interconnected by links, information defining a performance of each link;
   identifying, by the controller, at least one under-performing link of the network based on the received information; and
   adjusting, by the controller, the performance of each identified under-performing link of the network by, for each respective identified under-performing link of the network:
   computing, based on the received information, at least one updated layer-2 protocol parameter that increases a service rate of a number of packet fragments transmitted through the respective identified under-performing link for at least one traffic flow of the respective identified under-performing link; and
   sending the computed at least one updated layer-2 protocol parameter to at least one node of the respective identified under-performing link.

2. The method as claimed in claim 1, wherein computing the at least one updated layer-2 protocol parameter comprises computing any one or more of:
   an updated Maximum Transmission Unit for the at least one traffic flow of the respective identified under-performing link; and
   an updated QoS policy of the respective identified under-performing link.

3. The method as claimed in claim 2, wherein the computed updated Maximum Transmission Unit for a first traffic flow of the respective identified under-performing link is different than a Maximum Transmission Unit for a second traffic flow of the under-respective identified performing link.

4. The method as claimed in claim 3, wherein the first traffic flow is a non-delay-sensitive traffic flow, and the second traffic flow is a delay-sensitive traffic flow, and wherein computing the updated Maximum Transmission Unit for the first traffic flow comprises iteratively doubling a size of the Maximum Transmission Unit for the first traffic flow until a performance degradation of the second traffic exceeds a first predetermined limit.

5. The method as claimed in claim 4, further comprising reducing the size of the Maximum Transmission Unit for the first traffic flow in accordance with a binary search algorithm until a performance improvement of the second traffic flow is less than a second predetermined limit.

6. The method as claimed in claim 2, wherein computing the updated QoS policy comprises selecting a QoS policy from among a set of two or more predetermined QoS policies.

7. The method as claimed in claim 1, wherein at least one of the number of packet fragments comprises a layer-3 or higher data packet having a size that is less than an average packet size.

8. The method as claimed in claim 1, wherein the information defining the performance of each link comprises one or more of:
   traffic description information defining characteristics of each traffic flow in each link of the layer-2 abstraction;
   path description information defining a topology of the layer-2 abstraction; and
   performance information describing a performance of each link of the layer-2 abstraction.

9. The method as claimed in claim 8, wherein identifying at least one under-performing link of the network comprises:
   identifying overlapping links of the layer-2 abstraction based on the path description information, wherein the overlapping links comprise two or more links of the layer-2 abstraction that utilize a common physical layer link; and
   identifying, from among the identified overlapping links, links of the layer-2 abstraction that are under-performing, based on the performance information.

10. A controller of a layer-2 abstraction of a network comprising a plurality of nodes interconnected by links, the controller comprising:
    a central processing unit; and
    a non-transitory storage medium storing software instructions configured to control the central processor unit to:
    receive information defining a performance of each link of the layer-2 abstraction;
    identify at least one under-performing link of the network based on the received information; and
    adjust the performance of each identified under-performing link of the network by, for each respective identified under-performing link:
    computing, based on the received information, at least one updated layer-2 protocol parameters that increases a service rate of a number of packet fragments transmitted through the respective identified under-performing link for at least one traffic flow of the respective under-performing link; and
    sending the computed at least one updated layer-2 protocol parameter to at least one node of the respective identified under-performing link.

11. The controller as claimed in claim 10, wherein computing the at least one updated layer-2 protocol parameter comprises computing any one or more of:
    an updated Maximum Transmission Unit for the at least one traffic flow of the respective identified under-performing link; and
    an updated QoS policy of the respective identified under-performing link.

12. The controller as claimed in claim 11, wherein the computed updated Maximum Transmission Unit for a first traffic flow of the respective identified under-performing link is different than a Maximum Transmission Unit for a second traffic flow of the respective identified under-performing link.

13. The controller as claimed in claim 12, wherein the first traffic flow is a non-delay-sensitive traffic flow, and the second traffic flow is a delay-sensitive traffic flow, and wherein computing the updated Maximum Transmission Unit for the first traffic flow comprises iteratively doubling a size of the Maximum Transmission Unit for the first traffic flow until a performance degradation of the second traffic exceeds a first predetermined limit.

14. The controller as claimed in claim 13, further comprising reducing the size of the Maximum Transmission Unit for the first traffic flow in accordance with a binary search algorithm until a performance improvement of the second traffic flow is less than a second predetermined limit.

15. The controller as claimed in claim 10, wherein identifying at least one under-performing link of the network comprises:
　identifying overlapping links of the layer-2 abstraction based on path description information defining characteristics of each traffic flow in each link of the layer-2 abstraction, wherein the overlapping links comprise two or more links of the layer-2 abstraction that utilize a common physical layer link; and
　identifying, from among the identified overlapping links, links of the layer-2 abstraction that are under-performing, based on performance information describing a performance of each link of the layer-2 abstraction.

16. A computer readable memory having recorded thereon statements and instructions for execution by a computer, said statements and instructions comprising:
　code means for receiving, by a controller of a layer-2 network abstraction comprising a plurality of nodes interconnected by links, information defining a performance of each link;
　code means for identifying, by the controller, at least one under-performing link of the network based on the received information; and
　code means for adjusting, by the controller, the performance of each identified under-performing link of the network by, for each respective identified under-performing link of the network:
　　code means for computing, based on the received information, at least one updated layer-2 protocol parameter that increases a service rate of a number of packet fragments transmitted through the respective identified under-performing link for at least one traffic flow of the respective identified under-performing link; and
　　code means for sending the computed at least one updated layer-2 protocol parameter to at least one node of the respective identified under-performing link.

17. The computer readable memory as claimed in claim 16, wherein computing the at least one updated layer-2 protocol parameter comprises computing any one or more of:
　an updated Maximum Transmission Unit for the at least one traffic flow of the respective identified under-performing link; and
　an updated QoS policy of the respective identified under-performing link.

18. The computer readable memory as claimed in claim 17, wherein the computed updated Maximum Transmission Unit for a first traffic flow of the respective identified under-performing link is different than a Maximum Transmission Unit for a second traffic flow of the under respective identified performing link.

19. The computer readable memory as claimed in claim 16 wherein at least one of the number of packet fragments comprises a layer-3 or higher data packet having a size that is less than an average packet size.

20. The computer readable memory as claimed in claim 16, wherein the information defining the performance of each link comprises one or more of:
　traffic description information defining characteristics of each traffic flow in each link of the layer-2 abstraction;
　path description information defining a topology of the layer-2 abstraction; and
　performance information describing a performance of each link of the layer-2 abstraction.

* * * * *